July 19, 1938.  G. S. ALLIN ET AL  2,124,047
TANDEM WHEEL TRUCK
Filed March 24, 1936  2 Sheets-Sheet 2
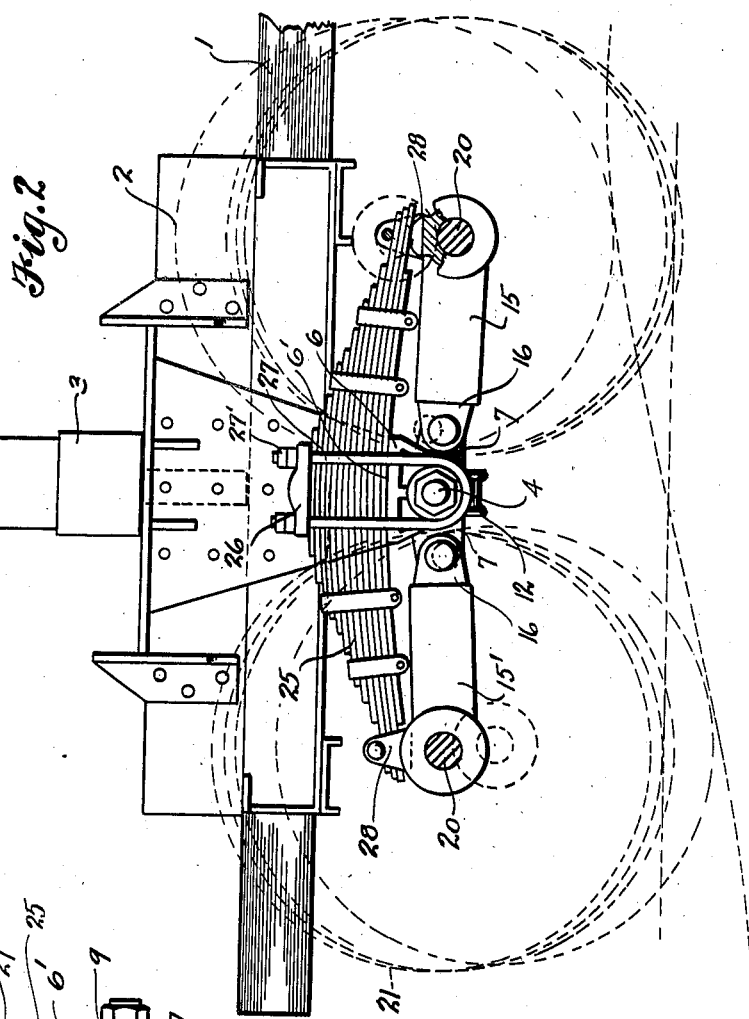
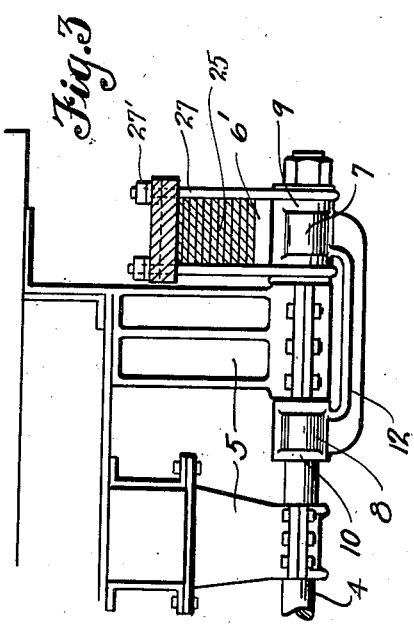
INVENTOR.
GEORGE S. ALLIN
FRANK V. BISTROM
BY
Cook + Robinson
ATTORNEYS.

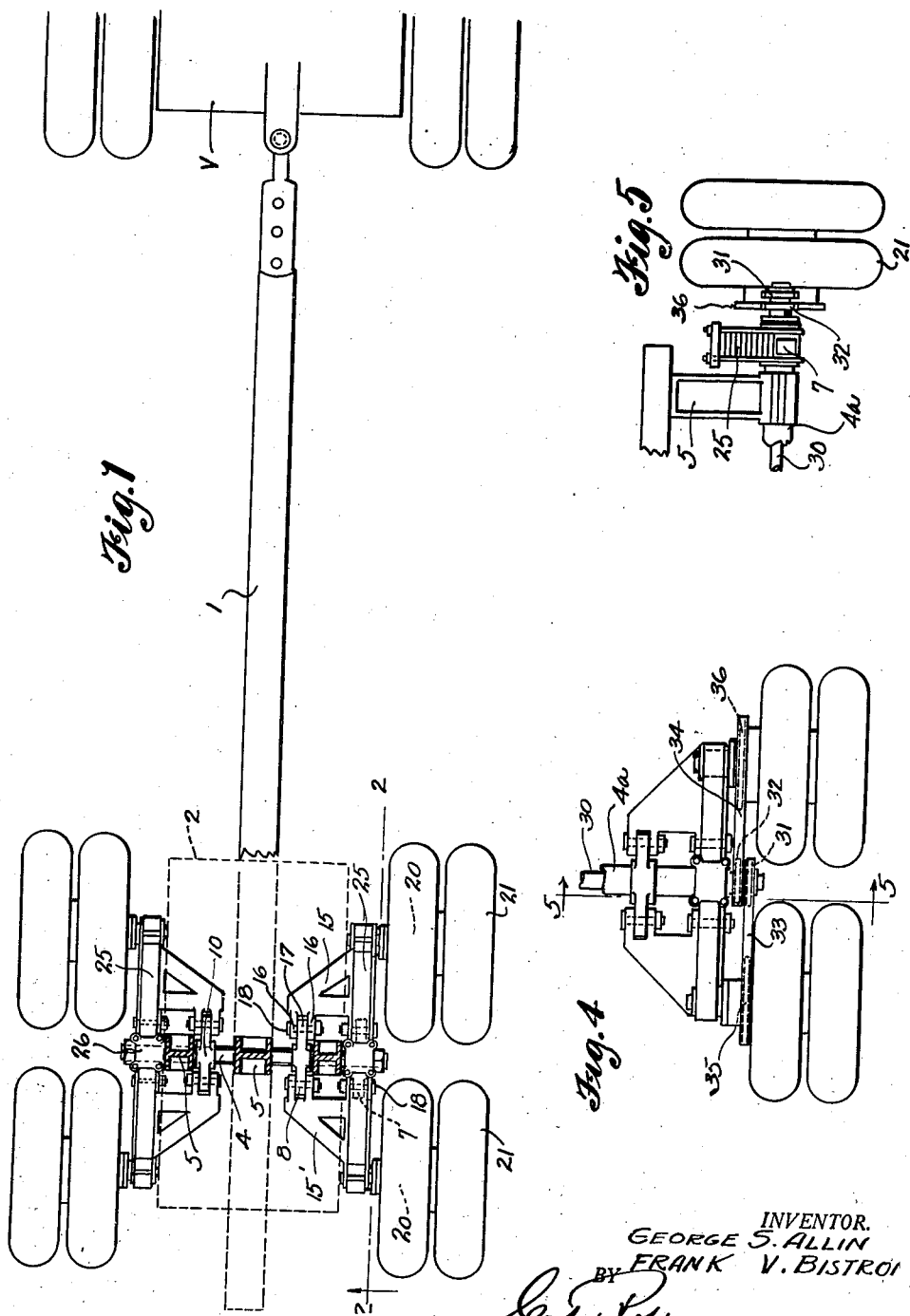

Patented July 19, 1938

2,124,047

UNITED STATES PATENT OFFICE 2,124,047

TANDEM WHEEL TRUCK

George S. Allin and Frank V. Bistrom, Seattle, Wash.

Application March 24, 1936, Serial No. 70,635

1 Claim. (Cl. 280—124)

This invention relates to improvements in wheeled trucks and has reference more particularly to wheeled trucks of a type especially suitable for logging trailers, powered trucks, and other load hauling vehicles; it being the principal object of the invention to provide an improved form of truck with tandem wheel arrangement, spring mounted, in a manner to insure rigidity together with extreme flexibility of movement; wherein vibration and shock, incident to travel over rough and uneven roadways, is absorbed to a maximum extent; whereby lateral tilt, by reason of wheels at one side passing across a high obstruction or recess, is materially reduced, and also to provide a construction that is eminently suited to vehicles designed for hauling heavy loads, and which, by reason of their use, may be required to travel over rough and irregular roadways; for example, over logging roads.

It is also an object of the present invention to provide a tandem truck construction, known in trade as a "full oscillating type", wherein the wheels are arranged in tandem at opposite sides of the vehicle, and are independently mounted on a transverse trunnion axle, and wherein the forward and rearward sets of wheels of each tandem set are hinged for independent vertical oscillations and support their load through the mediacy of a half elliptical spring that is centrally and pivotally mounted on the trunnion axle with its opposite ends engaged functionally against the hinged wheel mountings.

It is still another object of this invention to provide a tandem truck of the kind above stated which is adapted either to be power driven or to be used as a trailer.

Still other objects of the invention reside in the details of construction; in the combination of parts and in their mode of operation, as will hereinafter be fully described.

In accomplishing these and other objects of the invention, we have provided the improved details of construction, the preferred forms of which are illustrated in the accompanying drawings, wherein—

Fig. 1 is a top, or plan, view of a wheeled truck embodied by the present invention, as applied to a trailing vehicle.

Fig. 2 is a sectional view of the same, on the line 2—2 in Fig. 1, particularly illustrating the oscillating action of the hinged wheel mounting knees, and the rocking action of the spring hanger on the trunnion shaft; the wheels being shown in dotted lines for purpose of better illustration.

Fig. 3 is a sectional detail, in a vertical plane longitudinally of the trunnion axle, particularly illustrating the connection yoke between the knee hanger bearings.

Fig. 4 is a plan view, illustrating an embodiment of the invention with power driven wheels.

Fig. 5 is a sectional detail on line 5—5 in Fig. 4.

Referring more in detail to the drawings, and first, with reference to the invention as disclosed in Figs. 1, 2 and 3, which discloses a construction particularly designed for trailing vehicles—

1 designates the trailer reach, and 2 designates, in its entirety, the load supporting structure on which a cross bunk 3 is pivotally mounted; it being understood that the structure 2 is adjustable to different positions along the reach and that means is provided whereby it may be secured at different positions of adjustment therealong; also, that the forward end of the reach would be pivotally attached to a powered vehicle which also could be equiped to carry a part of the load; such a vehicle being indicated at V in Fig. 1.

Disposed beneath the structure 2 transversely thereof, is a trunnion axle 4 which is fixedly and solidly supported beneath the structure 2 by means of bearing brackets 5. In Fig. 1 of the drawings, one bracket is shown as being centrally located beneath the structure, and is solidly fixed thereto, while the others are equally spaced from the central bracket and support the axle near its outer ends.

Pivotally mounted on the opposite ends of the trunnion axle 4 are the wheel and spring hanger castings 6, each of which comprises, at its outer end, an upwardly facing spring seat 6', symmetrically disposed directly above the trunnion axle, and, at opposite sides of the spring seat, are forwardly and rearwardly extended hinge ears 7—7. At the inner end of each casting 6, and integral therewith, are hinge ears 8—8, of the same extent and in alinement with the ears 7—7 at the outer end. The bearing portions of the spring and wheel hanger castings 6, through which the trunnion axle extends, are located directly between the paired ears 7—7 and 8—8, and these two bearing portions, designated, respectively, by numerals 9 and 10, as seen in Fig. 3, are joined by a downwardly bowed connecting yoke or rib 12 so that they will have the same rotative action on the mounting axle, and will always maintain the same relationship to each other. The castings are retained on the ends of the trunnion axle by nuts 4'.

Hingedly attached to each of the spring hanger castings 6 to extend, respectively, forwardly and rearwardly thereof, are wheel mounting knees 15 and 15', each of which, in plan, as seen in Fig. 1, is a frame of right angle triangular form, with one leg thereof located parallel to the trunnion axle and provided at its ends with spaced hinge ears 16—16 and 17—17, overlapped, respectively, with the ears 7 and 8 at that side of the casting, and pivotally connected thereto by hinge bolts 18, thereby permitting the outer end portions of these knee frames to oscillate vertically. As seen also in Fig. 1, the outside leg of these knee frames 15—15' extend at right angles to the trunnion axle and are in alinement relative to the longitudinal direction of the vehicle. Each knee is provided at its swinging end with a horizontally and laterally extended spindle 20 on which the truck wheels 21 are revolubly mounted and secured in the usual manner.

Seated upon the spring seat 6 of each of the castings 5 is a load supporting spring 25 of the semi-elliptical type, secured firmly in place by a centrally located, overlying clamp plate 26, through which paired U-bolts 27, that embrace the trunnion axle at opposite sides of the spring, are extended and the plate drawn tight by nuts 27 threaded onto the U-bolts. At opposite ends of the spring 25, at each side of the vehicle, the ends of the springs are extended slidably through openings in guide shackles 28 at the outer ends of the knees 15—15', thus to sustain the load equally on the two sets of wheels. Relative movement of the spring ends and shackles is permitted by the spring ends sliding in the openings.

As will be observed by reference to Fig. 2, the forward and rearward sets of wheels at each side of the vehicle are independently, vertically movable and thus will readily accommodate themselves, by reason of the flexibility of the spring, to usual road irregularities.

It is also apparent that, since the spring hanger castings 6 are pivotally mounted on the cross shaft 4, the wheel mountings are bodily rotatable about the trunnion axis and thus will readily accommodate themselves to the passing of the wheels over quite high obstructions and without any material lifting of that side of the vehicle; this being due to the fact that the forward and rearward sets of wheels will pass in succession over the obstruction and a considerable amount of lift of the load, as each wheel passes over the obstruction, is taken care of in upward deflection of the spring. It is also to be understood that the two sets of wheels at opposite sides of the trailer are independent of each other, and the passing of the wheels at one side over an obstruction has no material effect on the wheels at the other side.

In Figs. 4 and 5, there has been illustrated a means for applying power to the wheels for driving. The arrangement of parts in this modification, in most respects, is like that of Fig. 1, except that the trunnion axle 4a is tubular and contains therein the usual, power driven differential axles 30, which extend beyond the outer ends of the trunnion axle and are there equipped with sprocket wheels 31—32 over which sprocket chain belts 33—34 extend, respectively, over sprocket wheels 35 and 36, secured concentrically to inner faces of the wheels of the forward and rearward sets. Thus, trucks of this type are well adaptable either to powered or trailing vehicles and without any different mode of operation insofar as the spring action is concerned.

Trucks of this kind are especially useful on vehicles for hauling heavy loads in rough districts. They are especially useful in logging operations since the construction permits extreme flexibility of action, and a maximum absorption of shock with a relatively small amount of vibration, tilt or shock on the load supports. Furthermore, the wheels are rigidly sustained in tracking alinement and cannot toe in or out by reason of spring deflection.

Having thus described our invention, what we claim as new therein and desire to secure by Letters Patent is—

In a vehicle of the character described, a frame, a transverse axle, brackets fixed to the frame at opposite sides thereof and rigidly mounting said transverse axle therein, wheel hangers revolubly mounted on the end of said axle, each hanger having spaced bearing portions revoluble on the axle end at opposite sides of the mounting bracket at that side, and having portions extended forwardly and rearwardly of the axle, wheel mounting knees hingedly attached to said extended portions of the hangers to swing about axes that are spaced from and parallel to the transverse axle, wheel spindles fixed on the outer ends of said knees, and a spring fixed on each hanger and bearing at its ends against the knees at that side of the frame above the axial lines of the wheel spindles, to support the frame.

GEORGE S. ALLIN.
FRANK V. BISTROM.